(12) United States Patent
Wang et al.

(10) Patent No.: US 11,408,509 B2
(45) Date of Patent: Aug. 9, 2022

(54) SEALING PLUG

(71) Applicant: ILLINOIS TOOL WORKS INC., Glenview, IL (US)

(72) Inventors: Xing Wang, Shanghai (CN); Mengli Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 178 days.

(21) Appl. No.: 16/995,236

(22) Filed: Aug. 17, 2020

(65) Prior Publication Data

US 2021/0048105 A1 Feb. 18, 2021

(30) Foreign Application Priority Data

Aug. 16, 2019 (CN) .......................... 201910758008.7
Jun. 19, 2020 (CN) .......................... 202010567124.3

(51) Int. Cl.
*F16J 15/10* (2006.01)

(52) U.S. Cl.
CPC .................................. *F16J 15/104* (2013.01)

(58) Field of Classification Search
CPC ........... B62D 25/24; F16J 13/14; F16J 15/104
See application file for complete search history.

(56) References Cited

U.S. PATENT DOCUMENTS

| | | | | |
|---|---|---|---|---|
| 9,714,055 B2 * | 7/2017 | Shimada | ................ | B62D 25/24 |
| 2001/0049858 A1 * | 12/2001 | Huet | ...................... | B62D 25/24 16/2.1 |
| 2008/0142517 A1 * | 6/2008 | Nakazato | ............... | B62D 25/24 220/359.4 |
| 2011/0005141 A1 * | 1/2011 | Leverger | ................ | B62D 25/24 49/463 |
| 2014/0125081 A1 * | 5/2014 | Pares Isanta | .......... | B62D 25/24 296/1.06 |
| 2014/0311038 A1 * | 10/2014 | Iwahara | ................. | B62D 25/24 49/466 |
| 2016/0244104 A1 * | 8/2016 | Kuhm | .................... | B05C 21/005 |
| 2017/0152948 A1 * | 6/2017 | Huebner | ................ | B62D 25/24 |
| 2019/0092397 A1 * | 3/2019 | Sugimoto | .............. | B62D 25/24 |

FOREIGN PATENT DOCUMENTS

| | | | | |
|---|---|---|---|---|
| JP | 2013221547 A | * | 10/2013 | |
| JP | 2014043936 A | * | 3/2014 | ............. B62D 25/24 |
| JP | 2015081659 A | * | 4/2015 | ............. B62D 25/24 |
| JP | 2016191462 A | * | 11/2016 | |
| JP | 2017150604 A | * | 8/2017 | |
| JP | 2018138794 A | * | 9/2018 | ............. B60R 13/08 |
| JP | 2019116952 A | * | 7/2019 | ............... F16J 13/14 |

* cited by examiner

*Primary Examiner* — Eugene G Byrd
(74) *Attorney, Agent, or Firm* — Quarles & Brady LLP (57) ABSTRACT

Provided in the present application is a sealing plug for sealing a hole in a panel, the sealing plug comprising a collar, a supporting lip, and a sealing lip. The collar has at least one collar recess formed by an upward depression from a lower edge, and the at least one collar recess is located below the collar sealing portion. The supporting lip connecting end is connected to an outer periphery of a lower portion of the collar, the supporting lip has at least one supporting lip recess, of which, extends from the supporting lip connecting end to the supporting end, and is aligned with the at least one collar recess. The sealing lip connecting end is connected to an upper portion of the collar. The sealing plug provided in the present application can be easily inserted into the hole in the panel.

13 Claims, 8 Drawing Sheets

// SEALING PLUG

This application claims the benefit of Chinese Patent Application No. 202010567124.3 filed on Jun. 19, 2020 and Chinese Patent Application No. 201910758008.7 filed on Aug. 16, 2019, which are hereby incorporated by reference in their entirety.

TECHNICAL FIELD

The present application relates to a sealing plug, and in particular to a sealing plug for sealing a hole in a panel.

BACKGROUND ART

When a vehicle body of a vehicle is manufactured, multiple openings and holes will be created in a panel of the vehicle body structure, and these openings and holes will allow moisture and dust to enter. Therefore, it is necessary to use a sealing plug to seal these openings and holes to prevent dust or water from entering. The sealing plug can be inserted into the openings and holes of body parts and form a seal with the panel. Therefore, a sealing plug that is easy to install and is convenient is required to seal the openings and holes in the panel of the vehicle body structure.

SUMMARY OF THE INVENTION

The present application provides a sealing plug, comprising: a collar, the collar enclosing a cylindrical space, the collar comprising a collar sealing portion disposed in the cylindrical space, the collar having at least one collar recess formed by an upward depression from its lower edge, the at least one collar recess being located below the collar sealing portion; a supporting lip, the supporting lip having a supporting lip connecting end and a supporting end, the supporting lip connecting end being connected to an outer periphery of a lower portion of the collar, the supporting lip extending upwardly from the supporting lip connecting end and away from a central axis of the collar, the supporting lip having at least one supporting lip recess, the at least one supporting lip recess extending from the supporting lip connecting end to the supporting end, and the at least one supporting lip recess being aligned with the at least one collar recess; and a sealing lip, the sealing lip having a sealing lip connecting end and a sealing end, the sealing lip connecting end being connected to an upper portion of the collar, and the sealing lip extending downwardly from the sealing lip connecting end and away from the central axis of the collar.

According to the sealing plug as described above, the at least one collar recess comprises two collar recesses that are disposed opposite to each other, and the two collar recesses are symmetrical relative to the central axis of the collar; and the at least one supporting lip recess comprises two supporting lip recesses that are respectively aligned with the two collar recesses.

According to the sealing plug as described above, the two supporting lip recesses extend all the way from the supporting lip connecting end to the supporting end so as to divide the supporting lip into a first supporting lip and a second supporting lip.

According to the sealing plug as described above, upper portions of the first supporting lip and the second supporting lip each have shallow recesses formed by a downward depression, and the bottom of the shallow recesses is spaced from the supporting lip connecting end.

According to the sealing plug as described above, on the periphery of the collar at least two ribs are provided, the at least two ribs extend in an axial direction of the collar, and at least part of the at least two ribs is located above the first supporting lip or the second supporting lip and spaced from an upper surface of the first supporting lip or an upper surface of the second supporting lip.

According to the sealing plug as described above, the depth of the shallow recess is half the width of the first supporting lip and the second supporting lip.

According to the sealing plug as described above, in a radial direction of the collar, the at least two ribs are disposed to be staggered from the shallow recesses.

According to the sealing plug as described above, in the axial direction of the collar, the collar sealing portion is spaced from a joint of the supporting lip connecting end and the collar.

According to the sealing plug as described above, the collar further comprises a guide portion, and the guide portion is located below the supporting lip connecting end.

According to the sealing plug as described above, the width of an upper portion of the collar recess is less than the width of a lower portion of the collar recess.

The sealing plug provided in the present application can be easily inserted into the hole in the panel, and cannot be easily caught by the hole or an opening during insertion due to the affection of an installation angle. Moreover, the sealing plug in the present application has a proper insertion force.

DETAILED DESCRIPTION OF EMBODIMENTS

Particular embodiments of the present application are described below with reference to the accompanying drawings which constitute part of this description. It should be understood that although the terms such as "front", "rear", "upper", "lower", "left", and "right" indicating directions in the present application are used to describe various exemplary structural parts and elements in the present application, these terms used herein are merely used for ease of description and are determined based on the exemplary orientation shown in the accompanying drawings. Since the embodiments disclosed in the present application can be arranged in different directions, these terms indicating directions are only illustrative and should not be considered as limitations.

Figure 1A:
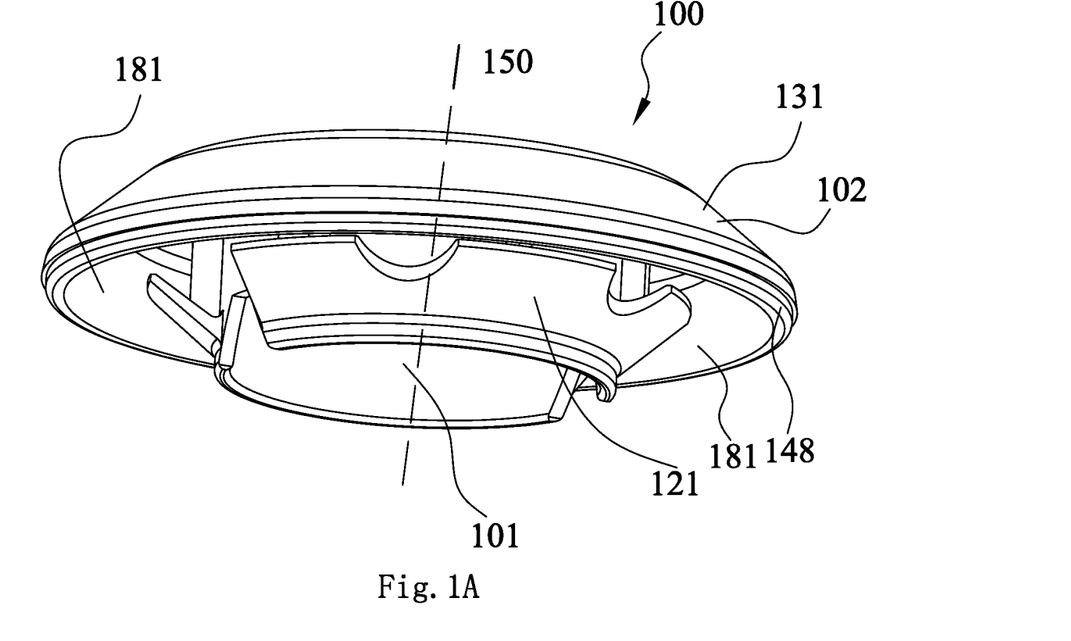
FIG. 1A is a perspective view of one embodiment of a sealing plug in the present application.
Figure 1B:
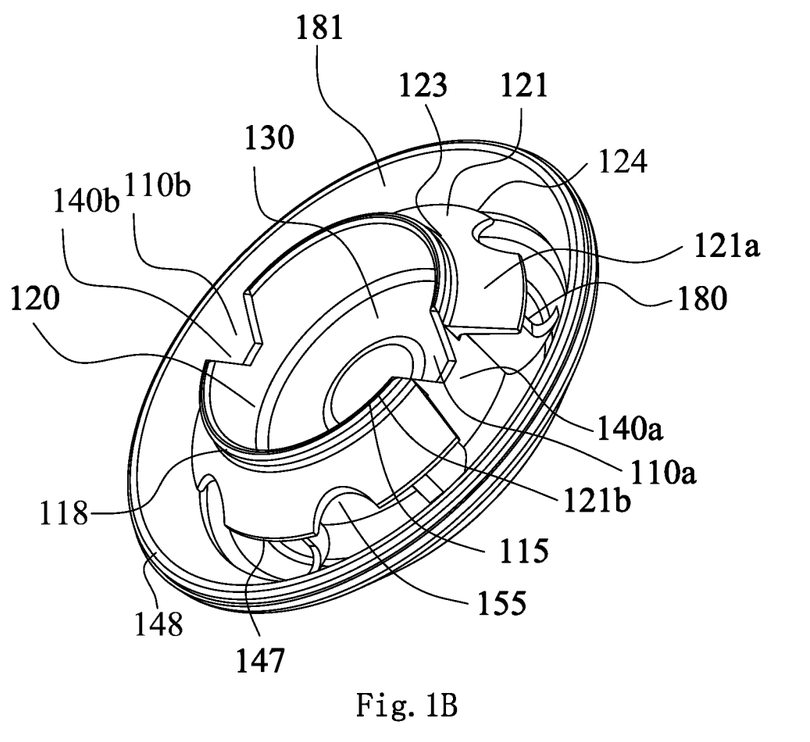
FIG. 1B is a perspective view of the sealing plug in FIG. 1A viewing from another perspective.
Figure 1C:
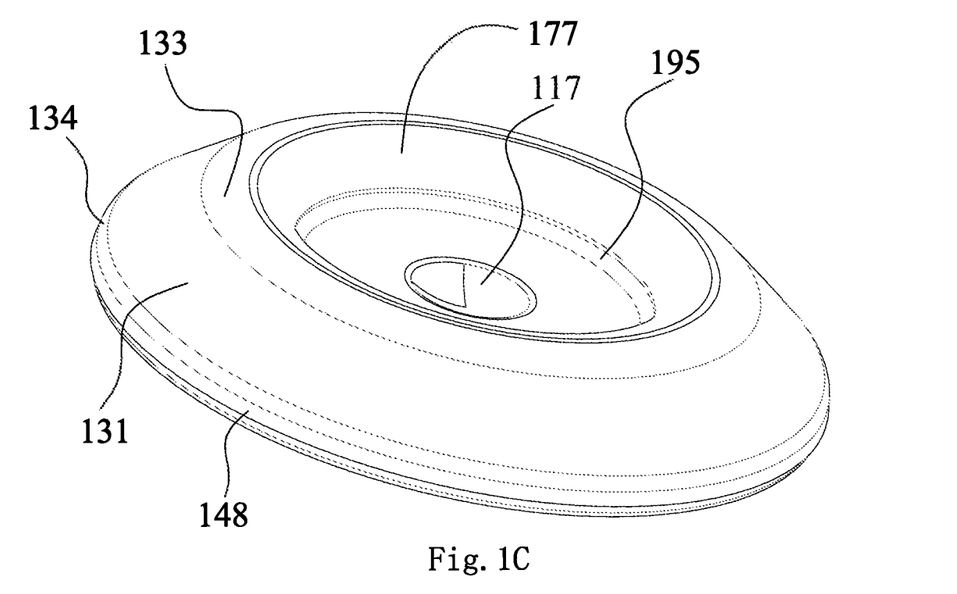
FIG. 1C is a perspective view of the sealing plug in FIG. 1A viewing from yet another perspective.
Figure 2:
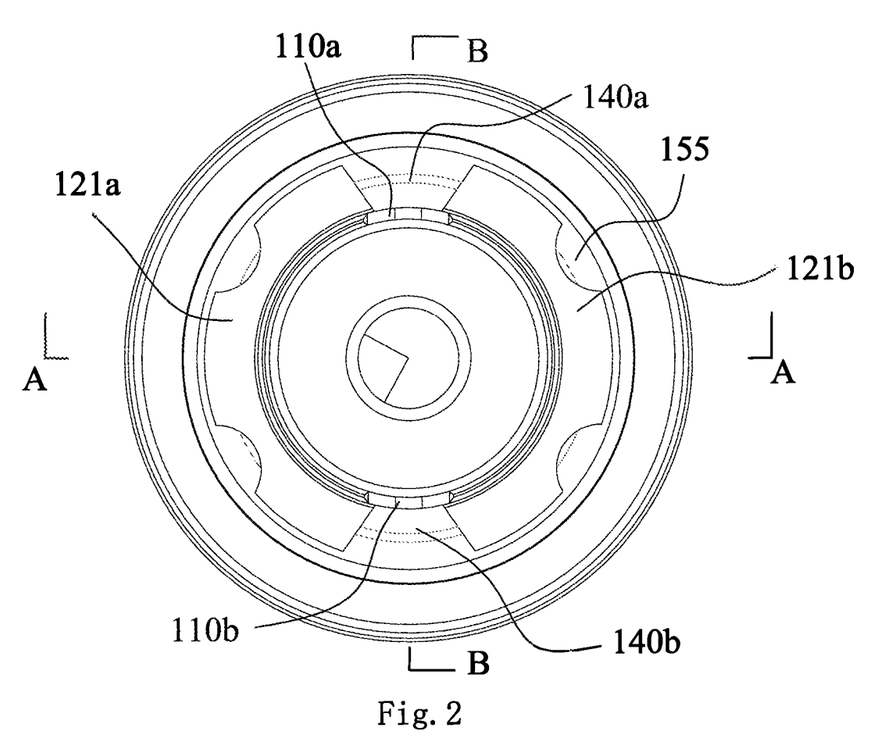
FIG. 2 is a bottom view of the sealing plug in FIG. 1A.
Figure 3A:
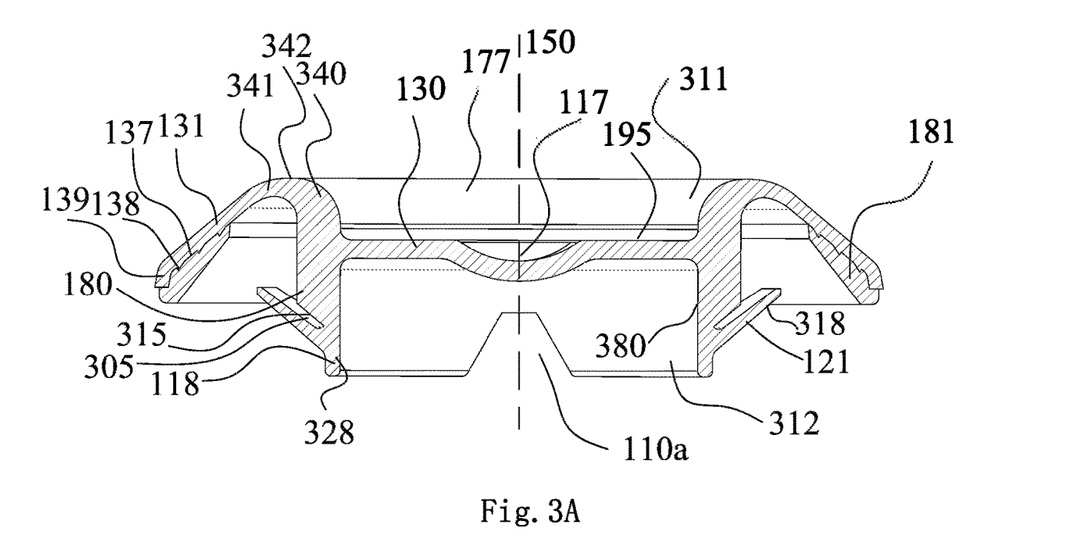
FIG. 3A is a sectional view of the sealing plug in FIG. 2 along line A-A.
Figure 3B:
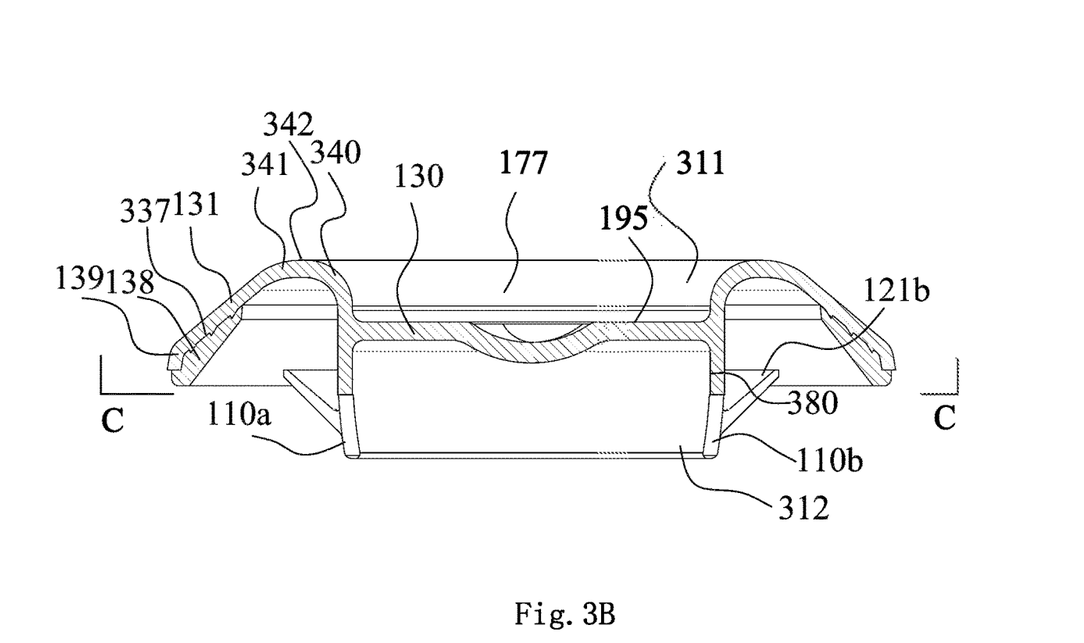
FIG. 3B is a sectional view of the sealing plug in FIG. 2 along line B-B.

FIG. 1A is a perspective view of one embodiment of a sealing plug in the present application, FIG. 1B is a perspective view of the sealing plug in FIG. 1A viewing from another perspective, FIG. 1C is a perspective view of the sealing plug in FIG. 1A viewing from yet another perspective, FIGS. 1A to 1C show the structure of the sealing plug 100, FIG. 2 is a bottom view of the sealing plug in FIG. 1A, FIG. 3A is a sectional view of the sealing plug in FIG. 2 along line A-A, and FIG. 3B is a sectional view of the sealing plug in FIG. 2 along line B-B. As shown in FIGS. 1A to 1C, the sealing plug 100 is used to be inserted into the hole in the panel and seals the hole in the panel. The sealing plug 100 comprises a sealing plug main body 102 and a sealing member 181, the sealing plug main body 102 is integrally formed by an injection molding process, and the sealing member 181 is molded on the sealing plug main body 102 by means of a secondary molding process. The sealing plug main body 102 is made of a thermoplastic material, and has elasticity. The sealing member 181 is made of hot-melt adhesive, and can be melted by heat. The sealing plug main body 102 comprises a collar 101, a supporting lip 121, and a sealing lip 131, wherein the supporting lip 121 and the sealing lip 131 are respectively connected to the collar 101. When the sealing plug 100 is mounted in the hole in the panel, the supporting lip 121 and the sealing lip 131 are respectively located on two sides of the panel, and the supporting lip 121 and the sealing lip 131 can deform to a certain extent.

As shown in FIGS. 1A to 3B, the collar 101 encloses a cylindrical space 120, and has an upper opening 311 and a lower opening 312. The outer diameter of the collar 101 is less than the inner diameter of the hole in the panel. The collar 101 further comprises a collar sealing portion 130, the collar sealing portion 130 is disposed in the cylindrical space 120 and connected to an inner wall 380 of the collar 101, and the collar sealing portion 130 is disposed between the upper opening 311 and the lower opening 312 and respectively spaced from the upper opening 311 and the lower opening 312. The collar sealing portion 130 is a substantially circular plate, and the outer side of the collar sealing portion 130 in a circumferential direction is connected to an inner wall 380 of the collar 101 so as to obstruct the cylindrical space 120 such that the upper opening 311 is not in communication with the lower opening 312. The collar sealing portion 130 also provides support for the collar 101 such that the collar 101 cannot easily deform by compression. The collar sealing portion 130 is provided with a recess portion 117 that is recessed towards the lower opening 312, the center of the recess portion 117 coincides with the central axis 150 of the collar 101, and the recess portion 117 is used to accommodate burrs that may be generated during the molding of the sealing plug 100. The top of the collar 101 has a collar transition portion 340, and the collar transition portion 340 extends outwardly to form an arc-shaped transition for smooth connection with the sealing lip 131. The upper opening 311 of the collar 101 is formed of an upper end 342 of the collar transition portion 340. The bottom of the collar 101 has two collar recesses 110a and 110b that are formed by an upward depression from the lower edge 115, the two collar recesses 110a and 110b have the same shape and are symmetrical with respect to the central axis 150 of the collar 101, and the connecting line 217 between centers of the two collar recesses 110a and 110b passes through the central axis 150 of the collar 101. As an example, each of the two collar recesses 110a and 110b forms as a trapezoid gradually expanding from bottom to top, that is, the width of the upper portion is less than the width of the lower portion. In other embodiments, the two collar recesses 110a and 110b may also be of another shape, such as an arc and a triangle.

Further as shown in FIGS. 1A to 3B, the sealing lip 131 has a sealing lip connecting end 133 and a sealing end 134, the sealing lip connecting end 133 of the sealing lip 101 is connected to the collar transition portion 340 of the upper portion of the collar 101, and the sealing lip 131 extends downwardly from the sealing lip connecting end 133 and away from the central axis 150 of the collar 101. The sealing lip connecting end 133 has a sealing lip connecting end transition portion 341, the sealing lip connecting end transition portion 341 is connected to the upper end 342 of the collar transition portion 340, and the sealing lip connecting end transition portion 341 and the collar transition portion 340 form a smooth transition therebetween. The highest point of the sealing plug 100 is formed at the joint of the sealing lip connecting end transition portion 341 and the collar transition portion 340. In one embodiment, the sealing lip connecting end transition portion 341 and the collar transition portion 340 together form an arc-shaped outer surface. In the axial direction of the collar 101, the collar sealing portion 130 is disposed below the collar transition portion 340, that is, the collar sealing portion 130 is spaced from the collar transition portion 340, such that the upper surface 195 of the collar sealing portion 130 and the inner wall 380 of the collar 101 enclose a top space 177, and the top space 177 facilitates the sealing lip 131 to deform under an external force.

The sealing member 181 is ring-shaped, and the ring-shaped sealing member 181 is made of hot-melt adhesive and is molded on the lower surface 337 of the sealing end 134 of the sealing lip 131 by means of a secondary molding process. The sealing end 134 of the sealing lip 131 and the sealing member 181 together form a sealing portion 148. The lower portion of the sealing end 134 of the sealing lip 131 narrows inwards to form a lower edge 139, which facilitates connection with the sealing member 181 and facilitates contact with the panel having a hole via the sealing member 181. The sealing member 181 at least partially covers the bottom of the lower edge 139, such that when the sealing plug 100 is mounted on the panel, the sealing member 181 of the sealing lip 131 directly comes into contact with the panel, while the lower edge 139 of the sealing lip 131 cannot directly come into contact with the panel. The lower surface 337 of the sealing end 134 has a ring-shaped rib 138, such that the sealing member 181 molded on the lower surface 337 of the sealing end 134 of the sealing lip 131 cannot easily fall off. The ring-shaped rib 138 may also have other shapes, as long as a texture is formed on the lower surface 337 of the sealing end 134 of the sealing lip 131. The sealing member 181 gradually becomes thicker from top to bottom, which facilitates the formation of a larger contact area between the sealing member 181 and the panel.

The supporting lip 121 has a supporting lip connecting end 123 and a supporting end 124, the supporting lip connecting end 123 is connected to the periphery of the lower portion 328 of the collar 101, and the supporting lip 121 extends upwardly from the supporting lip connecting end 123 and away from the central axis of the collar 101. The outer diameter of the supporting end 124 is greater than the outer diameter of the hole 502. The supporting lip 121 has two supporting lip recesses 140a and 140b, and the two supporting lip recesses 140a and 140b have the same shape and are respectively aligned with the two collar recesses 110a and 110b, that is, the connecting line between centers of the two supporting lip recesses 140a and 140b passes through the central axis of the collar 101. The two supporting lip recesses 140a and 140b respectively extend all the way from the supporting lip connecting end 123 to the supporting end 124 so as to divide the supporting lip into a first supporting lip 121a and a second supporting lip 121b. On the circumference where the supporting lip connecting end 123 is located, the respective widths of the two supporting lip recesses 140a and 140b are not less than the respective widths of the two collar recesses 110a and 110b, that is, the first supporting lip 121a extends from the periphery of the collar recess 110a to the periphery of the collar recess 110b in the circumferential direction, and the second supporting lip 121b extends from the periphery of the collar recess 110a to the periphery of the collar recess 110b in the circumferential direction.

The upper portion 318 of the supporting lip 121 further has several shallow recesses 155 formed by a downward depression from the upper portion edge 147. Each shallow recess 155 is semicircular, with the center of the semicircle being disposed on the circumference where the upper portion edge 147 is located. In a lengthwise direction of the supporting lip 121, i.e., in the direction from the supporting lip connecting end 123 to the supporting end 124 of the supporting lip 121, the radius of the semicircular shallow recess 155 is half the width of the supporting lip 121, that is, the depth of the shallow recess 155 is half the width of the supporting lip 121. The first supporting lip 121a and the second supporting lip 121b each have two shallow recesses 155, and the two shallow recesses are evenly distributed on the respective first supporting lip 121a and second supporting lip 121b such that each of the first supporting lip 121a and the second supporting lip 121b is evenly divided into three sections. In other embodiments of the present application, the shallow recesses 155 may have other shapes, and may also be one or more in number. The collar recesses 110a and 110b, the supporting lip recesses 140a and 140b, and the shallow recesses 155 cooperate to reduce the insertion force by which the sealing plug is inserted into the hole of the panel. The collar recesses 110a and 110b provides a deformation space for the collar 101, and the supporting lip recesses 140a and 140b and the shallow recesses 155 respectively provide a deformation space for the supporting lip 121, which cooperate to reduce the insertion force of the sealing plug 100.

There is a certain space between the supporting lip connecting end 123 and the lower edge 115 of the collar 101 so as to form a guide portion 118 at a portion, below the supporting lip connecting end 123, of the collar 101, and the guide portion 118 is used to guide the sealing plug 100 to enter the hole in the panel.

The height of the top of the supporting end 124 of the supporting lip connecting end 123 is higher than the height of the bottom of the sealing portion 148 connected to the sealing lip 131, such that when the sealing plug 100 is mounted in the hole in the panel, the sealing end 134 of the sealing lip 131 and the supporting end 124 of the supporting lip connecting end 123 respectively apply a holding force to the panel from two sides of the panel such that the sealing plug 100 can be firmly fixed in the hole of the panel. The outer diameter of the supporting end 124 of the supporting lip connecting end 123 is greater than the outer diameter of the sealing end 134 of the sealing lip 131.

The periphery of the collar 101 is provided with six ribs 180, which are used to engage with the hole in the panel such that the sealing plug 100 will not easily shake relative to the panel. The structure of the rib 180 will be described below with reference to FIGS. 1A to 4.

Figure 4:
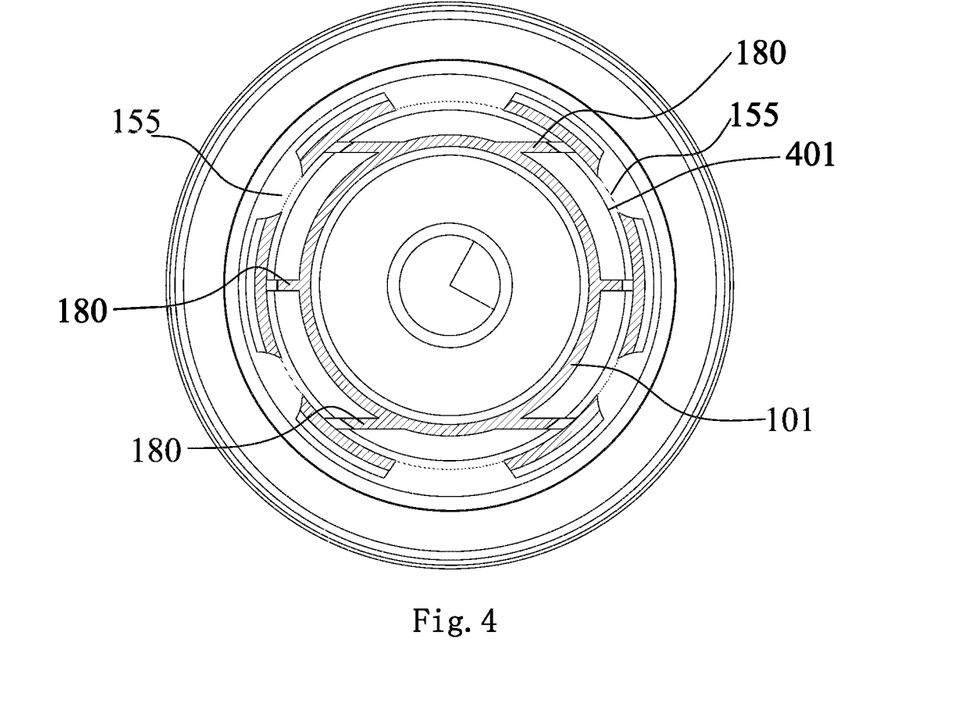
FIG. 4 is a radial cross-sectional view of the sealing plug in FIG. 1A.

FIG. 4 is a radial cross-sectional view of the sealing plug, and is a cross-sectional view of the entire sealing plug taken along C-C shown in FIG. 3B. As shown in FIGS. 1A to 4, the six ribs 180 extend in the axial direction of the collar 101, three ribs 180 of the six ribs 180 being located above the first supporting lip 121a, and the other three ribs 180 being located above the second supporting lip 121b. The three ribs 180 above the first supporting lip 121a or the second supporting lip 121b are respectively disposed to be staggered from the two shallow recesses 155, each shallow recess 155 being disposed between the adjacent two ribs 180. The other two ribs 180 are disposed above the collar recesses 110a and 110b.

Each of the ribs 180 above the first supporting lip 121a and the second supporting lip 121b is spaced from the upper surface of the first supporting lip 121a or the upper surface of the second supporting lip 121b. The cross-section shown in FIG. 3A just shows a pair of ribs 180. As shown in FIG. 3A, lower portions 315 of the pair of ribs 180 respectively form a deformation space 305 with upper surfaces of the first supporting lip 121a and the second supporting lip 121b, and the deformation spaces 305 enable the first supporting lip 121a and the second supporting lip 121b to deform inwardly without being blocked by the ribs 180.

As shown in FIG. 4, in the radial cross-section of the sealing plug 100, the outer edges of the six ribs 180 are on the same circumference 401, and the diameter of the circumference 401 is slightly less than or equal to the diameter of the hole in the panel, such that when the sealing plug 100 is inserted into the hole in the panel, the ribs 180 can abut against the inner periphery of the hole such that the sealing plug 100 will not easily shake relative to the panel.

In the radial cross-section of the sealing plug 100, the extension direction of each of the three ribs 180, above the first supporting lip 121a, extending outwardly from the collar is perpendicular to the connecting line 217 between centers of the collar recess 110a and the collar recess 110b, the extension direction of each of the three ribs 180, above the second supporting lip 121b, extending outwardly from the collar is perpendicular to the connecting line 217 between centers of the collar recess 110a and the collar recess 110b, and the three ribs 180 above the first supporting lip 121a are respectively symmetrical to the three ribs 180 above the corresponding second supporting lip 121b with respect to the connecting line 217 between centers of the collar recess 110a and the collar recess 110b. The ribs 180 above the collar recesses 110a and 110b are symmetrical with respect to the central axis of the sealing plug. In other embodiments, the number of the ribs 180 may be other numbers, and in the radial cross-section of the sealing plug 100, the ribs 180 may also extend in other directions, as long as the edges of the ribs 180 are on the same circumference.

Figure 5:
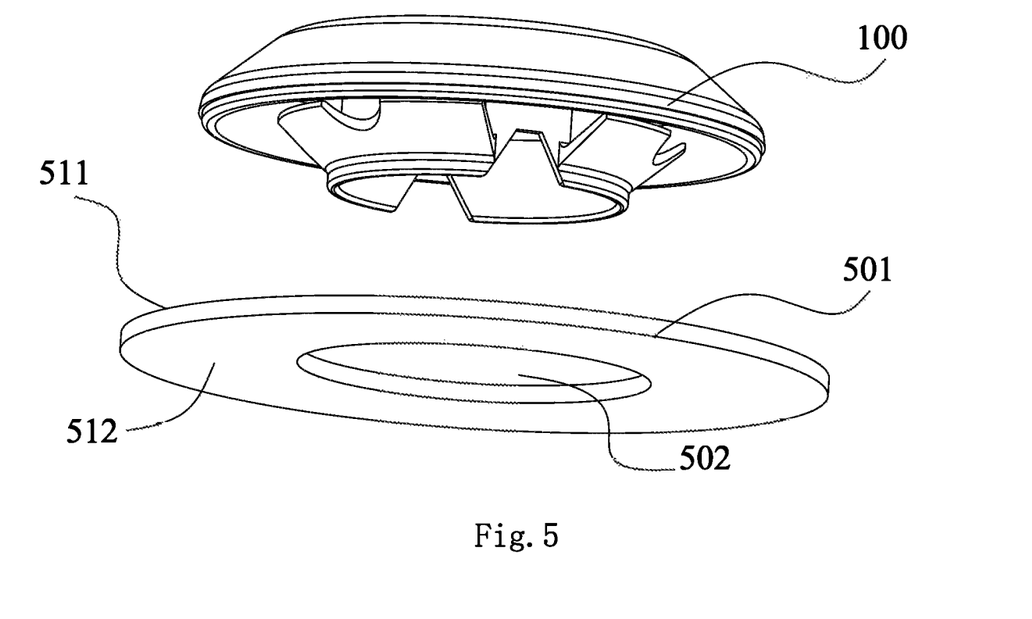
FIG. 5 is a perspective view of the sealing plug in FIG. 1A and a panel with a hole.

FIG. 5 is a perspective view of the sealing plug in the present application and a panel with a hole. As shown in FIG. 5, the panel 501 has a circular hole 502, and the sealing plug 100 is used to seal the hole 502 in the panel to isolate the fluid on two sides of the panel. The panel 501 has a first side 511 and a second side 512, the sealing plug is inserted into the hole 502 from a first side 511, such that the supporting lip 121 of the sealing plug 100 is located below the second side 512 of the panel, and the sealing lip 131 of the sealing plug 100 is located above the first side 511 of the panel. Then, a heat source is used for heating near the sealing plug 100 such that the sealing member 181 is melted by heat, and after returning to normal temperature, the sealing member 181 is solidified so as to bond the sealing lip 131 onto the first side 511 of the panel.

In practical applications, the panel 501 may be metal plate of a vehicle, and the metal plate has some holes required in the processing or assembly process. In order to prevent outside dust and water from entering the interior of the vehicle body, it is necessary to seal the holes, and the sealing plug in the present application can be used to seal the holes.

Figure 6A:
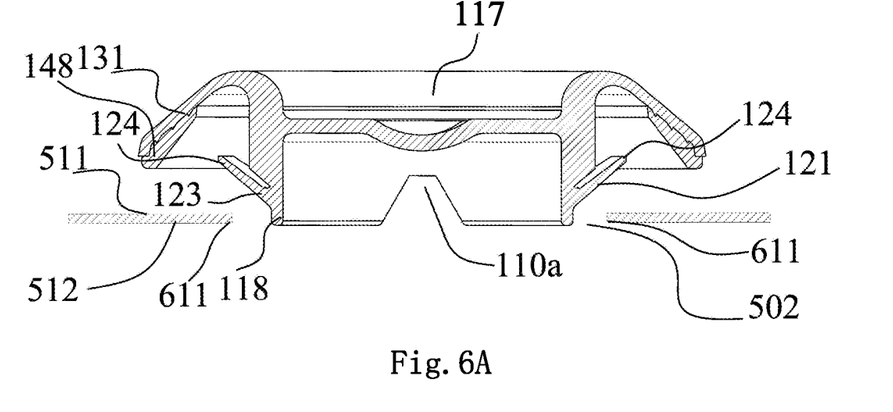
FIG. 6A is a schematic cross-sectional view of the sealing plug that will enter the hole in the panel.
Figure 6B:
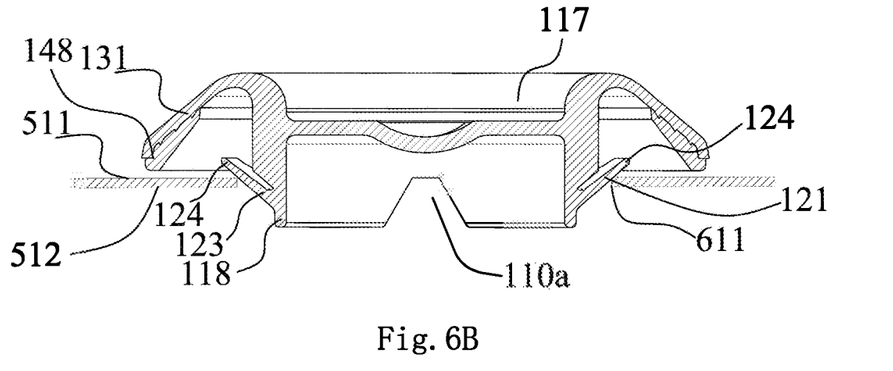
FIG. 6B is a schematic cross-sectional view of the sealing plug that abuts against the hole in the panel.
Figure 6C:
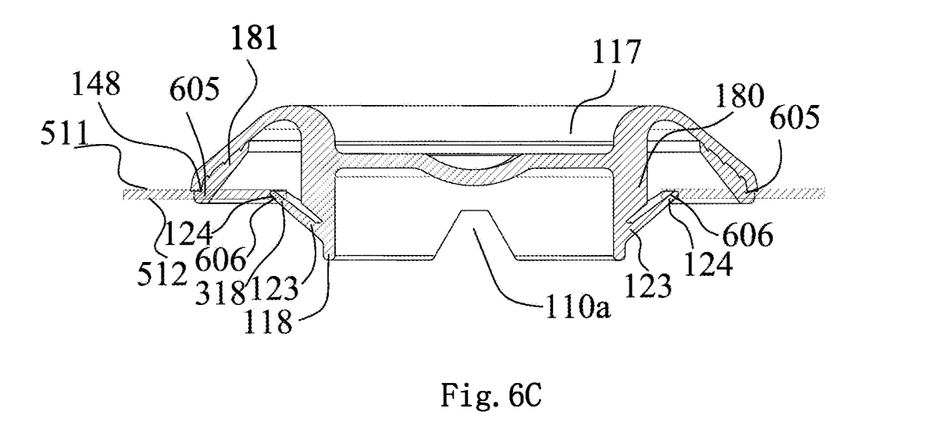
FIG. 6C is a schematic cross-sectional view of the sealing plug that is located at the position of the hole of the panel.

FIG. 6A is a schematic cross-sectional view of the sealing plug that will enter the hole in the panel, FIG. 6B is a schematic cross-sectional view of the sealing plug that abuts against the hole in the panel, and FIG. 6C is a schematic cross-sectional view of the sealing plug that has been located at the middle hole of the panel. FIGS. 6A-6C show changes in the relative positions of the sealing plug 100 and the panel 501 during the installation of the sealing plug.

FIGS. 6A to 6B show a process in which the sealing plug 100 enters the hole 502 and abuts against the edge of the hole 502 during the insertion of the sealing plug 100 into the hole 502. As shown in FIGS. 6A and 6B, when it is necessary to seal the hole in the panel with the sealing plug 100, the collar 101 of the sealing plug 100 is aligned with the hole 502 in the panel 501, since the outer diameter of the guide portion 118 of the collar 101 is less than the inner diameter of the hole 502, the guide portion 118 can easily enter the hole 502. After the guide portion 118 enters the hole 502, the supporting lip 121 gradually enters the hole 502 from bottom to top. Since the supporting lip 121 extends upwardly and outwardly from the supporting lip connecting end 123, the outer diameter of the supporting lip 121 gradually increases from bottom to top, and the outer diameter of the supporting end 124 of the supporting lip 121 is greater than the outer diameter of the hole 502. Therefore, the supporting lip 121 cannot pass through the hole 502, and the outer edge of the supporting lip 121 abuts against the inner periphery 611 of the hole 502.

FIGS. 6B to 6C show a process in which an external force is applied to force the sealing plug 100 to deform during the insertion of the sealing plug 100 into the hole 502 such that the supporting lip 121 passes through the edge of the hole 502. As shown in FIGS. 6B to 6C, when the outer edge of the supporting lip 121 abuts against the inner periphery 611 of the hole 502, a downward pressure is applied to the sealing plug 100 from the outside, and then the supporting lip 121 deforms under the pressure from the inner side edge of the hole 502 and bends inwardly, such that the outer diameter of the supporting end 124 of the supporting lip 121 is close to or less than the outer diameter of the hole 502, such that the sealing plug 100 can continue to move downwardly until the supporting lip 121 completely passes through the hole 502 and is no longer under the pressure from the inner periphery of the hole 502 and return to the state where the outer diameter of the supporting end 124 of the supporting lip 121 is greater than the outer diameter of the hole 502, such that the supporting end 124 of the supporting lip 121 abuts against the second side 512 of the panel 501. When the sealing plug 100 moves downwardly by an external force, since the height of the bottom of the sealing portion 148 of the sealing lip 131 is lower than the height of the top of the supporting end of the supporting lip 121, the sealing portion 148 of the sealing lip 131 will come into contact with the first side 511 of the panel 501 when the supporting lip 121 has not completely passed through the hole 502. Therefore, the pressure applied to the sealing plug 100 from the outside forces the supporting lip 121 to deform, and at the same time enables the sealing lip 131 to deform such that the sealing end 134 of the sealing lip 131 moves upwardly. That is, the pressure applied to the sealing plug 100 from the outside needs to overcome both the elastic force generated by the deformation of the supporting lip 121 and the elastic force generated by the deformation of the sealing lip 131.

FIG. 6C is a schematic diagram when the sealing plug 100 has been inserted into the hole 502 and only shows the positional relationship of the sealing plug 100 that does not deform and the panel 501, and thus there is a certain overlap between the sealing plug 100 and the panel 501. In practical applications, the portion 606, overlapping with the panel 501, of the supporting lip 121 in the figure will be located below the second side 512 of the panel 501 due to the deformation of the supporting lip 121, and the portion 605, overlapping with the panel 501, of the sealing lip 131 in the figure will be located above the first side 511 of the panel 501 due to the deformation of the sealing lip 131. At this time, the panel 501 is held between the supporting lip 121 and the sealing lip 131 by the sealing plug 100, and the supporting lip 121 and the sealing lip 131 of the sealing plug 100 respectively apply pressure to the first side 511 and the second side 512 of the panel 501, such that the sealing plug 100 cannot move with respect to the panel 501 in a direction perpendicular to the panel. The outer edge of the rib 180 and the inner periphery of the hole 502 have a small gap therebetween or come into contact with each other, such that the sealing plug 100 cannot move relative to the panel 501 in the horizontal direction or can only move within a small range.

At the position shown in FIG. 6C, the hole 502 has been closed by the sealing plug 100 such that the first side 511 of the panel 501 cannot be in communication with the second side 512. In order to further enhance the sealing, after the sealing plug 100 is installed in place, the heat source is applied to increase the temperature near the sealing plug 100 to melt the sealing member 181, such that the sealing member 181 in a molten state will flow to fill the gap between the supporting lip 121 and the panel 501. Then the heat source is removed, the sealing member 181 is solidified again, such that the supporting lip 121 is sealed against the panel 501, and the sealing plug 100 is firmly connected to the panel 501.

During a process in which pressure is applied to the sealing plug 100 such that the supporting lip 121 deforms, the upper portion 318 of the supporting lip 121 is compressed by the inner periphery 611 of the hole 502 to deflect inwardly, the supporting lip recesses 140a and 140b provide space for the deformation of the supporting lip 121, such that the supporting lip 121 can deform more easily so as to reduce the insertion force of the sealing plug 100. The supporting lip recesses 140a and 140b can effectively reduce the insertion force of the sealing plug 100. However, it is inadvisable to provide too many supporting lip recesses, because the supporting lip 121 is divided into multiple supporting lip portions by the supporting lip recesses, such that when the sealing plug 100 is inserted into the hole 502 in the panel 501, if the sealing plug 100 is inserted in an improper insertion angle, some supporting lip portions will easily pass through the hole 502, while the other supporting lip portions will be caught by the edge of the hole 502 and cannot pass through the hole 502, thus hindering the assembly of the sealing plug. The sealing plug 100 of the present application is only provided with a pair of supporting lip recesses 140a and 140b, which will not easily cause that one of the first supporting lip 121a and the second supporting lip 121b cannot enter the hole 502 due to the improper insertion angle of the sealing plug 100. The fewer supporting lip recesses will lead to a larger insertion force of the sealing plug. The sealing plug 100 in the present application reduces the insertion force of the sealing plug 100 by means of providing the collar recesses 110a and 110b, the shallow recesses 155 and the top space 177.

Specifically, during the process the supporting lip 121 deforms by an external force, the connecting end 123 of the supporting lip 121 applies inward pressure to the collar 101, and since the lower portion 328 of the collar 101 has the collar recesses 110a and 110b, the collar recesses 110a and 110b provide space for the deformation of the lower portion 328 of the collar 101, such that the lower portion 328 of the collar 101 tends to deflect inwardly. The presence of the collar recesses 110a and 110b can also reduce the insertion force of the sealing plug 100.

At the same time, during a process in which the supporting lip 121 deforms by an external force, the upper portion 318 of the supporting lip 121 is compressed by the inner periphery 611 of the hole 502 and deflects inwardly, and the shallow recesses 155 on the upper portion 318 of the supporting lip 121 provide space required for the deformation of the upper portion 318 of the supporting lip 121, such that the upper portion 318 of the supporting lip 121 deforms more easily, and thus the presence of the shallow recesses 155 can reduce the insertion force of the sealing plug 100.

In addition, when pressure is applied to the sealing plug 100 to insert the sealing plug 100 into the hole 502 in the panel, the sealing lip 131 will deform by the pressure from the panel 501. The upper surface 195 of the collar sealing portion 130 and the inner wall 380 of the collar 101 enclose a top space 177 to provide space for the deformation of the sealing lip 131, such that the sealing lip 131 deforms more easily so as to reduce the insertion force of the sealing plug 100.

Figure 7A:
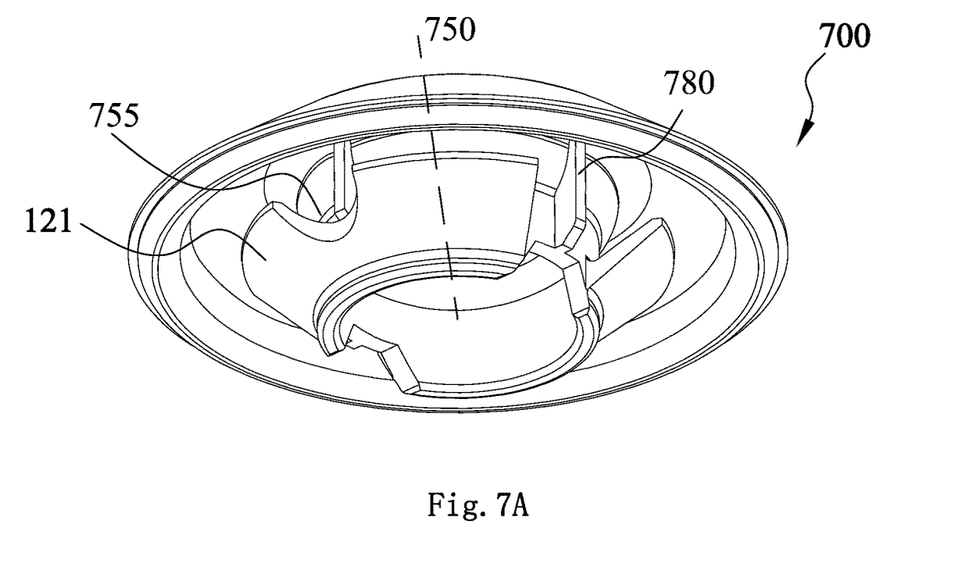
FIG. 7A is a perspective view of another embodiment of the sealing plug in the present application.
Figure 7B:
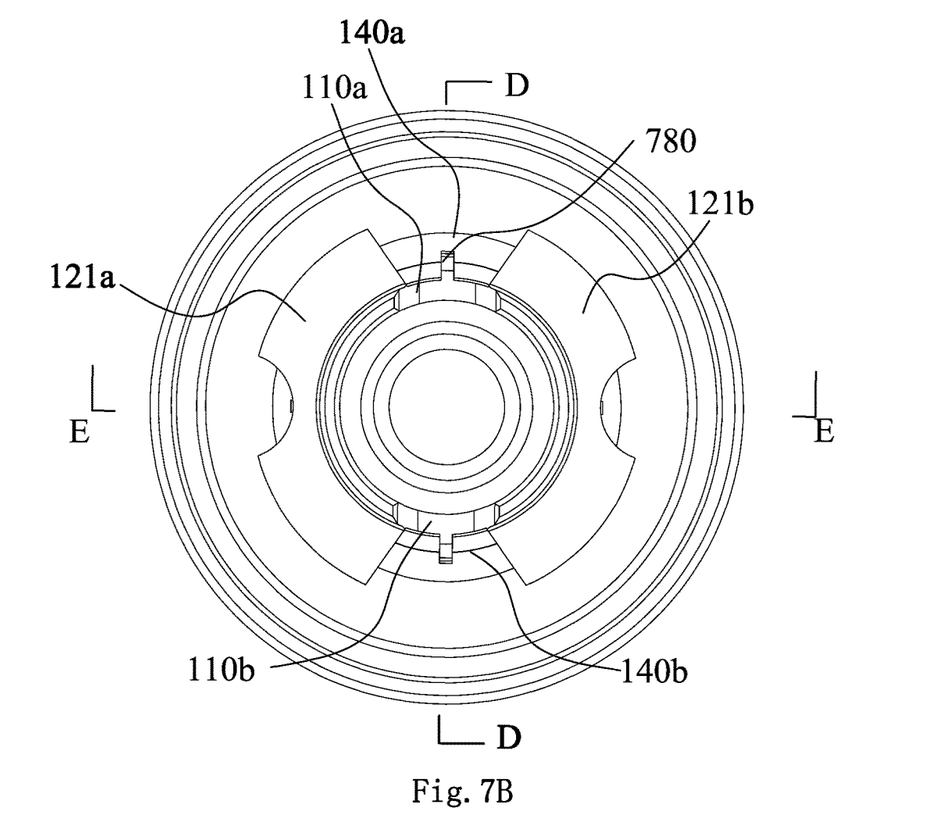
FIG. 7B is a bottom view of the sealing plug in FIG. 7A.
Figure 7C:
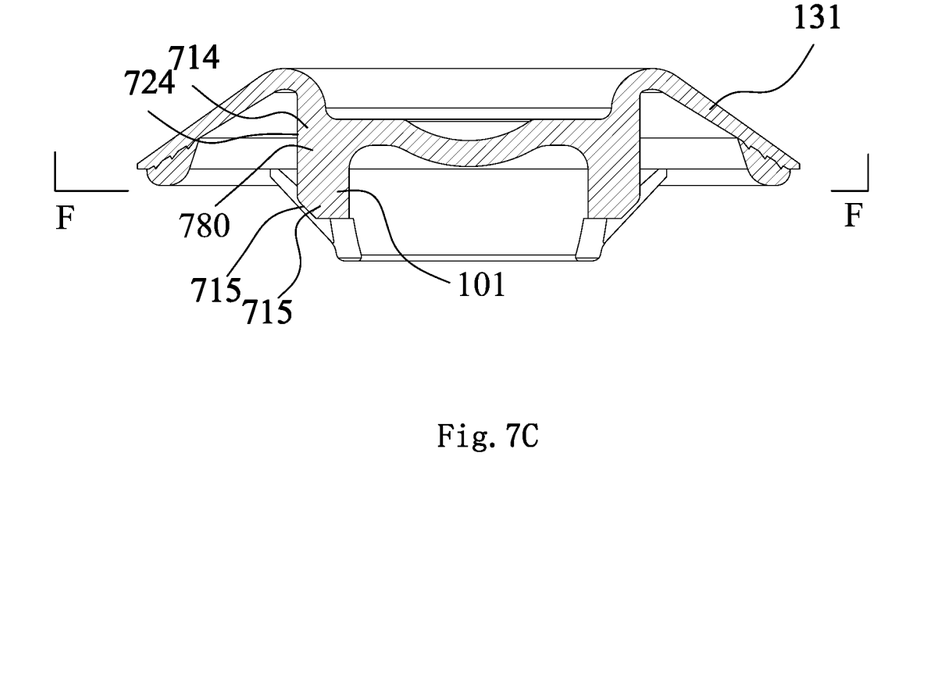
FIG. 7C is a sectional view of the sealing plug in FIG. 7B along line D-D.
Figure 7D:
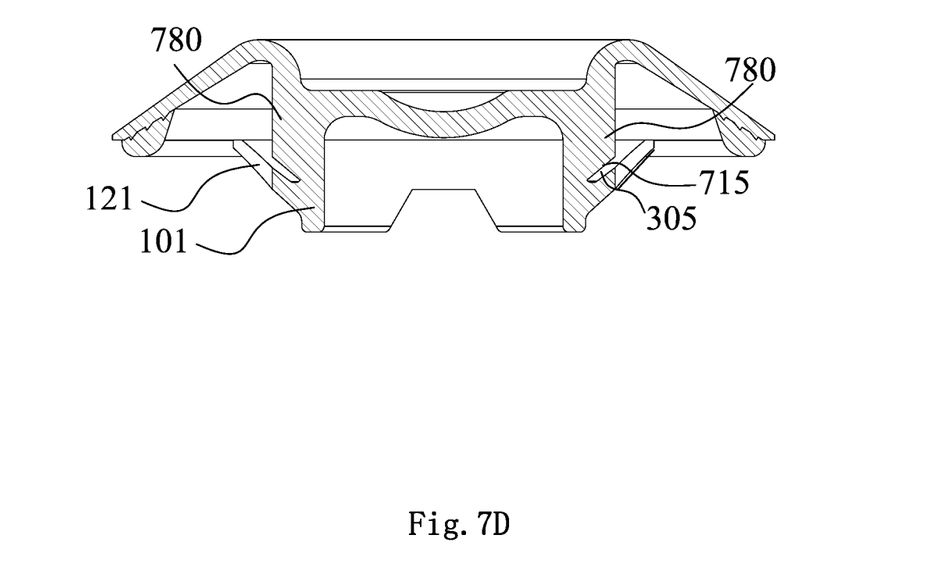
FIG. 7D is a sectional view of the sealing plug in FIG. 7B along line D-D.
Figure 7E:
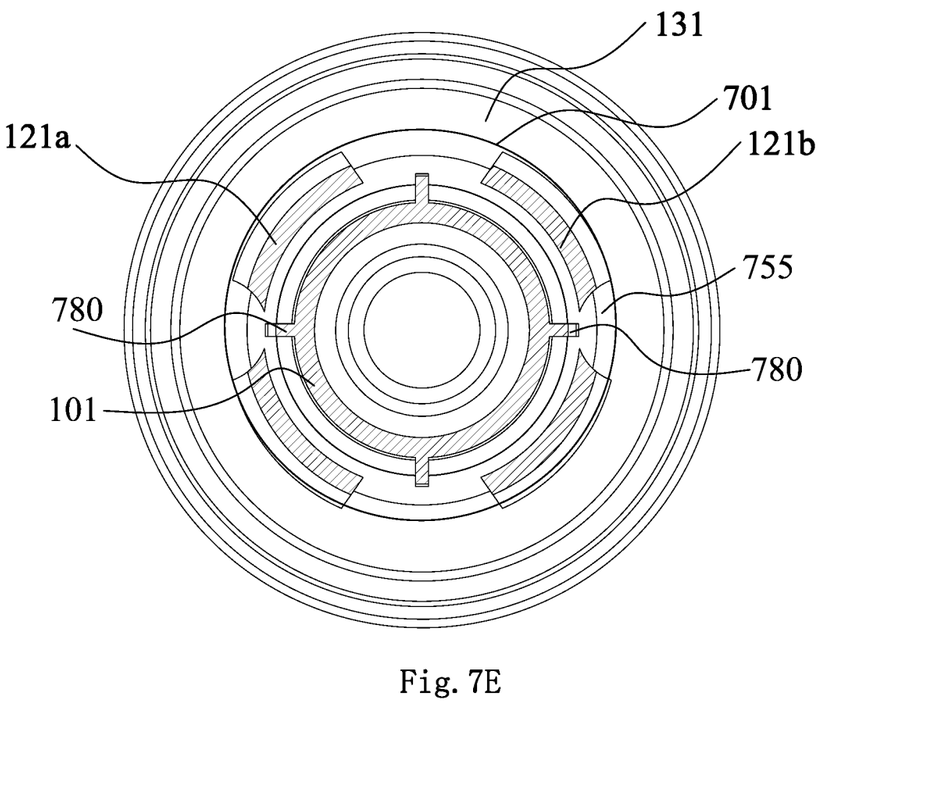
FIG. 7E is a radial cross-sectional view of the sealing plug in FIG. 7A.

FIG. 7A is a perspective view of another embodiment of the sealing plug in the present application, FIG. 7B is a bottom view of the sealing plug in FIG. 7A, FIG. 7C is a sectional view of the sealing plug in FIG. 7B along line D-D, FIG. 7D is a sectional view of the sealing plug in FIG. 7B along line E-E, and FIG. 7E is a radial cross-sectional view of the sealing plug in FIG. 7A, and is a cross-sectional view of the entire sealing plug taken along F-F shown in FIG. 7B. The sealing plug 700 shown in FIGS. 7A to 7D is similar to the sealing plug 100 shown in FIG. 1A, except that the configurations of shallow recesses 755 and ribs 780 of the sealing plug 700 are respectively different from the configurations of the shallow recesses 155 and the ribs 180 of the sealing plug 100. The shallow recesses 755 of the sealing plug 700 are different in number and size from the shallow recesses 155 of the sealing plug 100, and the ribs 780 of the sealing plug 700 are different in number and position from the ribs 180 of the sealing plug 100.

In the embodiment shown in FIGS. 7A to 7E, similar to the sealing plug 100 shown in FIG. 1A, the sealing plug 700 also has a collar 101, a supporting lip 121 and a sealing lip 131. The bottom of the collar 101 has two collar recesses 110a and 110b, and the two collar recesses 110a and 110b are disposed symmetrically with respect to the central axis 750 of the sealing plug. The supporting lip 121 has two supporting lip recesses 140a and 140b, and the two supporting lip recesses 140a and 140b have the same shape and are respectively aligned with the two collar recesses 110a and 110b. The supporting lip is divided into the first supporting lip 121a and the second supporting lip 121b by the two supporting lip recesses 140a and 140b.

Each of the first supporting lip 121a and the second supporting lip 121b has a semicircular shallow recess 755. The shallow recesses 755 are respectively located in the middle of the first supporting lip 121a and the second supporting lip 121b in the circumferential direction. Compared with the embodiment shown in FIG. 1A, the depth of the shallow recess 755 of the sealing plug 700 is greater than the depth of the shallow recess 155 of the sealing plug 100, and the depth of the shallow recess 755 is more than half the width of the first supporting lip 121a and the second supporting lip 121b. The shallow recesses 755 has an appropriate depth, which can ensure that the insertion force of the sealing plug 700 is within an appropriate range and will not be excessive in the case of fewer shallow recesses 755.

The outer periphery of the collar 101 is provided with four ribs 780, and the four ribs 780 are used to cooperate with the hole in the panel such that the sealing plug 700 will not easily shake relative to the panel. The four ribs 780 extend in the axial direction of the collar 101, a pair of ribs in the four ribs 780 are respectively aligned with the two collar recesses 110a and 110b, and another pair of ribs are respectively located above the first supporting lip 121a and the second supporting lip 121b and are respectively aligned with the two shallow recesses 755.

Each of the ribs 780 has a main body portion 714 and a lower portion 715, with the outer side 724 of the main body portion 714 being aligned with the joint of the rib 780 and the collar 101. That is, if the distance of the rib 780 extending outwardly from the collar 101 is referred to as the thickness of the rib 780, then the main body portion 714 has uniform thickness. The outer side 725 of the lower portion 715 extends inwardly from the bottom of the outer side 724 of the main body portion 714 until the outer side of the lower portion is flush with the outer side of the collar 101, that is, the thickness of the lower portion 715 gradually decreases from top to bottom. The inclination angle of the outer side 725 of the lower portion 715 is substantially the same as the inclination angles of the first supporting lip 121a and the second supporting lip 121b. As shown in FIG. 7C, the lower portions 715 of a pair of ribs 780, aligned with the two collar recesses 110a and 110b, among the four ribs 780 extend to the upper portion edges of the two collar recesses 110a and 110b, such that the lower portions 715 of the pair of ribs guide, together with the first supporting lip 121a and the second supporting lip 121b, the sealing plug 700 to enter the hole in the panel. The pair of ribs 780 aligned with the two collar recesses 110a and 110b can further avoid the situation where some supporting lip portions are caught in the hole in the panel due to the improper insertion angle of the sealing plug 700.

Each of the ribs 780 above the first supporting lip 121a and the second supporting lip 121b is spaced from the upper surface of the first supporting lip 121a or the upper surface of the second supporting lip 121b. The cross-section shown in FIG. 7C just shows a pair of ribs 780. As shown in FIG. 7D, lower portions 715 of the pair of ribs 780 respectively form a deformation space 305 with upper surfaces of the first supporting lip 121a and the second supporting lip 121b, and the deformation spaces 305 enable the first supporting lip 121a and the second supporting lip 121b to deform inwardly without being blocked by the ribs 780. Moreover, in the circumferential direction of the collar 101, a pair of ribs 780 shown in FIG. 7D are respectively aligned with the two shallow recesses 755, such that when the first supporting lip 121a and the second supporting lip 121b deform inwardly, the pair of ribs 780 can pass through the two shallow recesses 755 so as to protrude out of the outer periphery of the first supporting lip 121a and the second supporting lip 121b to further prevent the ribs 780 from hindering the inward deformation of the first supporting lip 121a and the second supporting lip 121b.

As shown in FIG. 7D, in the radial cross-section of the sealing plug 100, the four ribs 780 are evenly distributed, the peripheries of the four ribs 780 are on the same circumference 701, and the diameter of the circumference 701 is slightly less than or equal to the diameter of the hole in the panel. In the radial cross-section of the sealing plug 100, each of the ribs 780 extends outwards from the outer surface of the collar 101, and the extension direction of each rib 780 coincides with the direction of the connecting line between the central point of the rib 780 and the central axis of the sealing plug 700. The connecting line between the pair of ribs 780 aligned with the two shallow recesses 755 is perpendicular to the connecting line between the pair of ribs 780 aligned with the two collar recesses 110a and 110b.

The sealing plug 700 can achieve the same or similar technical effects as the sealing plug 100, and the number of the ribs 780 and the shallow recesses 755 in the sealing plug 700 can meet the requirements of the insertion force of the sealing plug 700. a pair of ribs 780 of the sealing plug 700 are aligned with the shallow recesses 755, and the other pair of ribs 780 is aligned with the collar recesses 110a and 110b, such that during the insertion of the sealing plug 700 into the panel, the interference between the ribs 780 and the supporting lip 121 is avoided or reduced so as to meet the requirements of the insertion force of the sealing plug 700.

Although only some features of the present application are illustrated and described herein, a person skilled in the art may make various improvements and changes. Therefore, it should be understood that the appended claims intend to cover all the foregoing improvements and changes that fall within the substantial spirit and scope of the present application.

The invention claimed is:

1. A sealing plug for sealing a hole in a panel, the sealing plug comprising:
    a collar, the collar enclosing a cylindrical space, the collar comprising a collar sealing portion disposed in the cylindrical space, the collar having at least one collar recess formed by an upward depression from a lower edge, the at least one collar recess being located below the collar sealing portion;
    a supporting lip, the supporting lip having a supporting lip connecting end and a supporting end, the supporting lip connecting end being connected to an outer periphery of a lower portion of the collar, the supporting lip extending upwardly from the supporting lip connecting end and away from a central axis of the collar, the supporting lip having at least one supporting lip recess, the at least one supporting lip recess extending from the supporting lip connecting end to the supporting end, and the at least one supporting lip recess being aligned with the at least one collar recess; and
    a sealing lip, the sealing lip having a sealing lip connecting end and a sealing end, the sealing lip connecting end being connected to an upper portion of the collar, and the sealing lip extending downwardly from the sealing lip connecting end and away from the central axis of the collar.

2. The sealing plug of claim 1, wherein the at least one collar recess comprises two collar recesses that are disposed opposite to each other, and the two collar recesses are symmetrical relative to the central axis of the collar; and
    the at least one supporting lip recess comprises two supporting lip recesses that are respectively aligned with the two collar recesses.

3. The sealing plug of claim 2, wherein the two supporting lip recesses extend from the supporting lip connecting end to the supporting end so as to divide the supporting lip into a first supporting lip and a second supporting lip.

4. The sealing plug of claim 1, wherein the upper portion of each of the first supporting lip and the second supporting lip has a shallow recess formed by a downward depression, and a bottom of the shallow recess is spaced from the supporting lip connecting end.

5. The sealing plug of claim 4, wherein an outer periphery of the collar is provided with at least two ribs, the at least two ribs extend in an axial direction of the collar, and at least part of the at least two ribs is located above the first supporting lip or the second supporting lip and spaced from an upper surface of the first supporting lip or an upper surface of the second supporting lip.

6. The sealing plug of claim 4, wherein a depth of the shallow recess is half the width of the first supporting lip and the second supporting lip.

7. The sealing plug of claim 5, wherein in a radial direction of the collar, the at least two ribs are disposed to be staggered from the shallow recesses.

8. The sealing plug of claim 5, wherein in the axial direction of the collar, the collar sealing portion is spaced from a joint of the supporting lip connecting end and the collar.

9. The sealing plug of claim 1, wherein the collar further comprises a guide portion, and the guide portion is located below the supporting lip connecting end.

10. The sealing plug of claim 1, wherein the width of an upper portion of the collar recess is less than the width of a lower portion of the collar recess.

11. The sealing plug of claim 4, wherein a depth of the shallow recess is greater than half of the width of the first supporting lip and the second supporting lip.

12. The sealing plug of claim 4, wherein at least part of the at least two ribs is located above a corresponding one of the at least one collar recess.

13. The sealing plug of claim 5, wherein in the radial direction of the collar, part of the rib in the at least two ribs is disposed to be aligned with the shallow recess.

* * * * *